No. 710,529.  
Patented Oct. 7, 1902.

W. C. SIMONS.
AXLE.
(Application filed Feb. 26, 1902.)

(No Model.)

Witnesses  
Louis D. Heinrichs  
L. H. Morrison

Inventor  
William C. Simons  
By his Attorney  
W. Preston Williamson

THE NORRIS PETERS CO., PHOTO-LITHO., WASHINGTON, D. C.

UNITED STATES PATENT OFFICE.

WILLIAM C. SIMONS, OF ARLINGTON, PENNSYLVANIA.

AXLE.

SPECIFICATION forming part of Letters Patent No. 710,529, dated October 7, 1902.

Application filed February 26, 1902. Serial No. 95,805. (No model.)

*To all whom it may concern:*

Be it known that I, WILLIAM C. SIMONS, a citizen of the United States, residing at Arlington, county of Wayne, and State of Pennsylvania, have invented a certain new and useful Improvement in Axles, of which the following is a specification.

My invention relates to a new and useful improvement in axles for vehicles, and has for its object to provide an axle so constructed that the wear upon the spindle can be taken up so as to always cause the hub of the wheel to fit the spindle in the proper manner.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
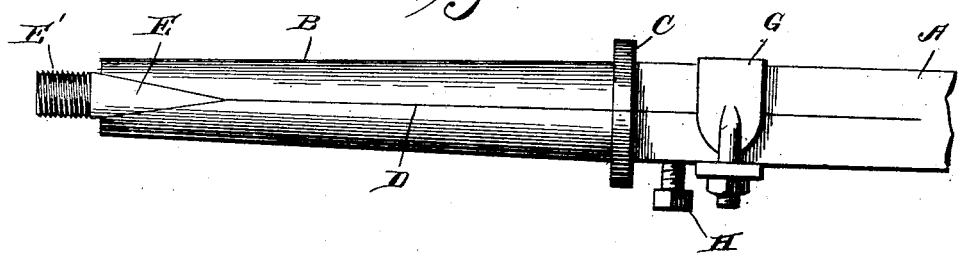
Figure 2:
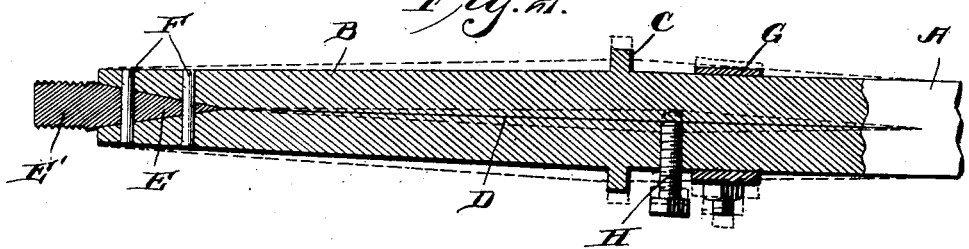
Figure 3:

Figure 1 is a side elevation of one end of an axle constructed according to my invention; Fig. 2, a longitudinal section of one end of an axle, showing the same in full lines in the normal position and in dotted lines in its extended position; Fig. 3, a detail plan view of the wedge-shaped plug being inserted in the end of the spindle.

It is a well-known fact in axles now in use that as the spindle is worn down the wheel becomes loose and will not run true upon the spindle thus reduced and the wheel will also have a side-to-side movement along the spindle on account of the wearing down of the bushing of the hub. This uneven rotation of the wheel not only causes great inconvenience to the owner of the vehicle, but the more lost motion there is between the hub and the spindle the greater is the increase in wear both upon the bushing and upon the spindle, and when it is desired to remedy this defect the only recourse now open to the user of the vehicle is either to replace the axles with new ones or to sever the spindle from the axle and forge new spindles thereon. In either case the owner of the vehicle will have to incur considerable expense. In my invention I do away with any necessity of removing the spindle on account of wear by so constructing the axle that the wear can gradually be taken up and so assure the spindle always fitting the bushing of the hub in proper manner.

Referring to the drawings in detail, A represents the axle, which is formed with the usual spindle B and inside collar C upon each end. The end of the axle is slit, as indicated at D, longitudinally through the spindle and a distance into the axle proper inside of the inner collar C. At the outer end of the spindle the slit D is widened out so as to form a wedge-shaped cavity, into which is inserted the wedge-shaped plug E, which plug has formed upon its outer end the screw-threaded portion E', upon which is adapted to be threaded the nut for holding the wheel upon the spindle. For the purpose of holding the two halves of the spindle together at the outer end and also holding the wedge-shaped plug E in place I insert one or more rivets F through the two halves of the spindle and also through the wedge-shaped plug E.

G is a clip which passes around the axle a slight distance inside of the collar C, and between this clip and the collar I thread a set-screw H through one-half of the axle, the end of said screw bearing against the other half, as shown in Fig. 2.

The operation of the device is as follows: When the axle is new, it will be in the position shown in Figs. 1 and 2 in full lines and be used the same as an ordinary axle; but after the spindles and bushing of the wheels have been subjected to enough use to cause said wheels to become loose upon the spindle I take up this wear by loosening the nuts upon the clip G. Then by turning the set-screw H, I spread the two halves of the axle, as shown in dotted lines in Fig. 2, until by trying the wheel it rides evenly upon the spindle thus adjusted. The space now formed between the two halves of the spindle is then filled with cotton-waste or other like material which will hold oil and also prevent any grit from entering between the two halves of the spindle. If after continual use the ends of the bushing of the hub are worn away, so that the wheel will shake from side to side longitudinally of the spindle, I take up this wear by punching out the rivets F and then filing off the outer end of the spindle and reinserting the plug E a sufficient distance into the end of the spindle until the nut upon the end of the plug E will come in proper contact with the hub of the wheel to hold it against any longitudinal movement of the wheel. Then by drilling new rivet-holes and passing the rivets through these holes I again secure the plug E in place. If desired, a wedge can be used instead of the set-screw H to separate the two halves of the axle.

The advantage of my invention is that by being able to take up the wear upon the spindle gradually as it is worn away I greatly increase the life of the spindle, and thus save the owner of the vehicle the expense of replacing the axles or spindles upon the same, and the initial cost of manufacturing an axle according to my invention will only be slightly in excess of an ordinary axle and will be very small compared to the expense that will be saved in repairing the axle.

Of course I do not wish to be limited to the exact construction here shown as slight modifications could be made without departing from the spirit of my invention.

Having thus fully described my invention, what I claim as new and useful is—

1. An axle slit from the outer end of each spindle longitudinally through the spindle, and a distance into the axle proper, the two halves upon the outer end of each spindle being secured rigidly together, a screw-threaded portion provided upon the outer end of the spindle for the reception of the usual nut, a set-screw threaded through half of the axle and bearing against the other half, the position of said screw being inside of the inner collar upon the axle, substantially as and for the purpose specified.

2. An axle slit longitudinally from the outer end of the spindle, through the spindle and a distance into the axle proper, the two halves of the spindle secured rigidly together at the other ends, and there provided with a screw-threaded portion for the reception of the nut, means for spreading the two halves of the axle for the purpose of taking up any wear upon the spindle, substantially as and for the purpose specified.

3. An axle slit longitudinally from the outer end of the spindle, through the spindle and a distance into the axle proper, a plug inserted in the outer end of the spindle, rivets passing through the two halves of the outer end of the spindle and also through the plug, a screw-threaded portion provided upon the plug outside of the outer end of the spindle, a set-screw threaded through half of the divided portion of the axle and bearing against the other half, a clip surrounding the divided portion of the axle in juxtaposition to the set-screw, substantially as and for the purpose specified.

4. In an axle, a wedge-shaped cavity formed in the outer end of the spindle, a wedge-shaped plug adapted to be inserted within said cavity, rivets passing through the outer end of the spindle and also through the wedge-shaped portion of the plug for holding the same in position, a screw-threaded portion formed upon the outer end of the plug beyond the outer end of the spindle, a longitudinal slit formed in the axle extending from the wedge-shaped cavity through the spindle and a distance into the axle proper, a set-screw threaded through half of the divided portion of the axle and bearing against the other half, and a clip surrounding the divided portion of the axle in juxtaposition to the set-screw, as and for the purpose specified.

In testimony whereof I have hereunto affixed my signature in the presence of two subscribing witnesses.

WILLIAM C. SIMONS.

Witnesses:
   A. L. BISHOP,
   D. BINGHAM.